Figure 1:
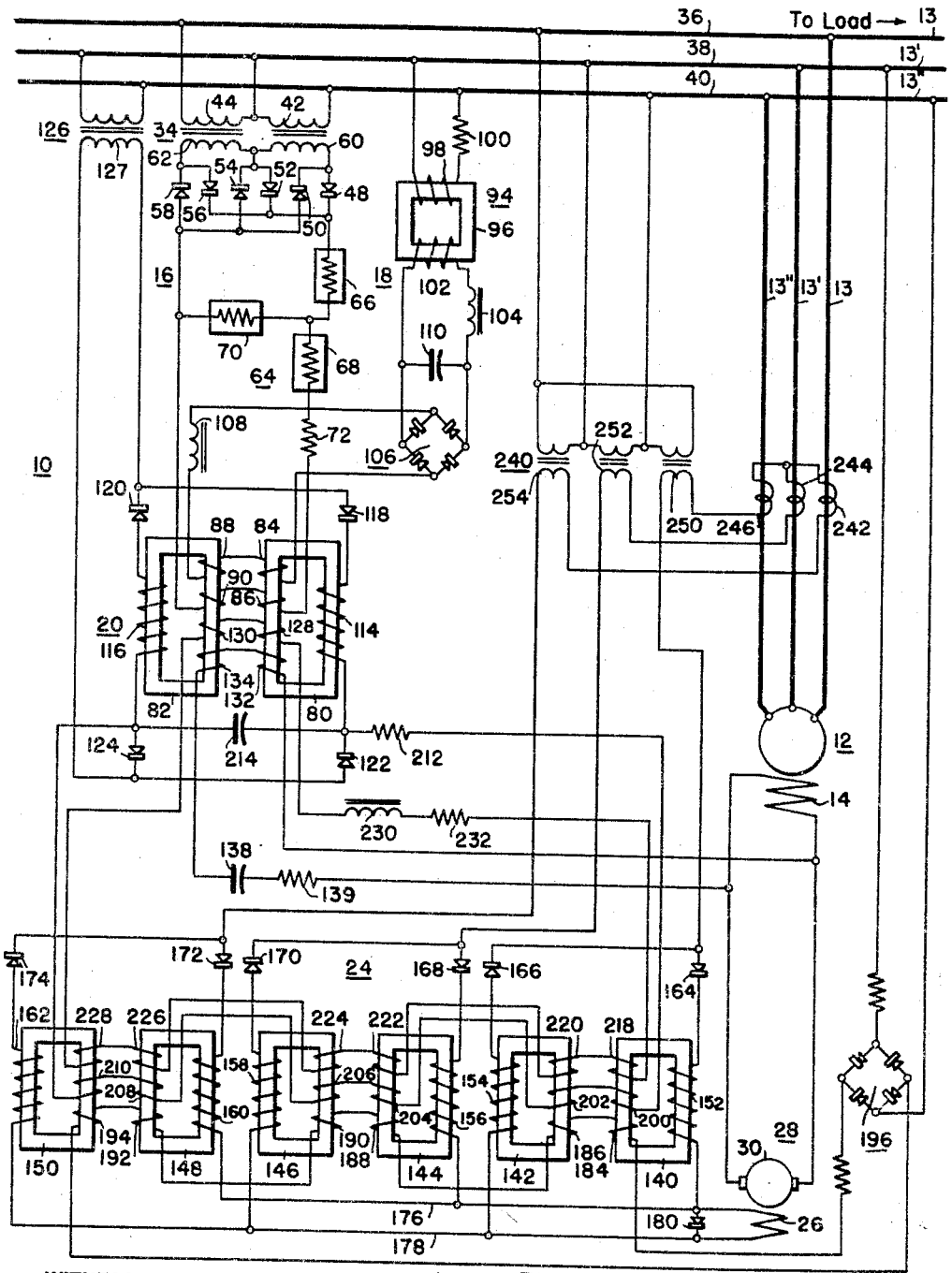

May 31, 1955   W. G. EVANS ET AL   2,709,776
VOLTAGE REGULATORS
Filed Feb. 5, 1953

WITNESSES:
E.A. McAlskey
K. H. Thomas

INVENTORS
William G. Evans
and William F. Horton.
BY
Ezra N. Savage
ATTORNEY

United States Patent Office 2,709,776
Patented May 31, 1955

2,709,776

VOLTAGE REGULATORS

William G. Evans and William F. Horton, Pittsburgh, Pa., assignors to Westinghouse Electric Corporation, East Pittsburgh, Pa., a corporation of Pennsylvania Application February 5, 1953, Serial No. 335,334

7 Claims. (Cl. 322—23)

This invention relates to regulators and in particular to regulators for maintaining the output voltage of an alternator substantially constant.

In order to manufacture a suitable voltage regulator, it is necessary to incorporate therein certain features. For instance, it is desirable to provide a regulator which has a high speed of response and a large gain while at the same time maintaining the stability of the regulating system. It is also often desirable to provide a regulator, the frequency of whose supply voltage can be varied over a wide range without affecting the normal operation of the regulator and one whose normal operation is not affected by changes in the temperature of the air surrounding the regulator. In the past, it has been found necessary to sacrifice one or more of these desirable features in order to obtain one or more of the remaining above-enumerated features. From a maintenance standpoint it is also preferred that all these features be obtained by means of static components.

An object of this invention is to provide for rendering a static alternator regulating system substantially insensitive to changes in the temperature of the surrounding air, by rendering a saturable reactor responsive to the difference in the output currents of a reference network and a sensing network responsive to the output of the alternator, and so temperature compensating the sensing network as to compensate for changes in the current outputs of the reference and sensing networks due to changes in the temperature of the surrounding air.

Another object of this invention is to provide in a temperature compensated alternator regulating system for inserting a damping factor into a two-stage saturable reactor responsive to the output of the alternator, by so disposing a damping winding in each stage of the saturable reactor and so interconnecting the damping windings with a delay network that oscillations in the regulating system are reduced without sacrificing the desired high gain of the saturable reactor.

Still another object of this invention is to provide in a temperature compensated alternator regulator system for improving the transient performance of the system which has incorporated therein a two-stage saturable reactor, by increasing the output of the second stage, by so interconnecting a current transformer responsive to the load current of the alternator and a potential transformer that their outputs are additive and are applied to the second stage to thereby increase its output.

A further object of this invention is to provide in a temperature compensated alternator regulator system for increasing the stability of the system having a two-stage saturable reactor incorporated therein, by so interconnecting a current transformer responsive to the load currents of the alternator and a potential transformer that their outputs are additive and are applied to the second stage, thereby requiring less gain in the saturable reactor thus increasing the stability of the regulator system.

A still further object of this invention is to provide in a temperature compensated alternator regulator system for preventing the removal of the alternator field excitation in case the alternator load is shorted, by connecting a current transformer so as to be responsive to the load current and so interconnecting therewith a potential transformer responsive to the alternator output voltage that when the load is shorted the current transformer continues to supply energy to the regulating system to thus provide the necessary field excitation.

Figure 2:
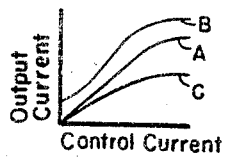

Other objects of this invention will become apparent from the following description when taken in conjunction with the accompanying drawings in which:

Figure 1 is a schematic diagram of circuits and apparatus illustrating an embodiment of the teachings of this invention; and Fig. 2 is a graph representing the manner in which the output current from the second stage amplifier illustrated in Fig. 1 varies with changes in the magnitude of the control current supplied thereto.

Referring to Fig. 1, there is illustrated a static voltage regulating system 10 for maintaining the output voltage of an alternator 12, having a field winding 14, substantially constant. In the particular embodiment illustrated, the alternator 12 is a three-phase generator disposed to supply energy to load conductors 13, 13' and 13".

The regulating system 10, in general, comprises a three-phase sensing network 16 responsive to the output voltage of the generator 12, a voltage reference network 18 responsive to the output voltage of the generator 12 and disposed to produce at its output a voltage which remains substantially constant over a wide range of variation in the magnitude and frequency of its input voltage, and a first stage saturable reactor 20 responsive to the current outputs of the sensing network 16 and the reference network 18 and so constructed that the current outputs of the networks 16 and 18 produce opposing fluxes in the saturable reactor 20 which have a predetermined difference when the output voltage of the generator 12 is at its regulated value. In practice, the flux produced by the current output of the sensing network 16 is always greater in magnitude than the flux produced in the magnetic amplifier 20 by the current output of the reference network 18.

In the embodiment illustrated, the saturable reactor 20 is a self-saturating, full-wave magnetic amplifier. A second-stage three-phase saturable reactor 24, which in the preferred embodiment is a full-wave self-saturating magnetic amplifier, is responsive to the output of the magnetic amplifier 20 and supplies current to the field winding 26 of an exciter 28. In order to render the field winding 14 of the generator 12 responsive to the current flow through the field winding 26 of the exciter 28, and thus maintain the output voltage of the generator 12 substantially constant, an armature 30 of the exciter 28 is electrically connected to the field winding 14.

In order to render the sensing network 16 responsive to the output voltage of the generator 12, a potential transformer 34 is electrically connected to the load conductors 13, 13' and 13" through line conductors 36, 38 and 40, respectively. In particular, the transformer 34 comprises primary winding sections 42 and 44, the primary winding section 42 being electrically connected to the line conductors 38 and 40 and the primary winding section 44 being electrically connected to the line conductors 36 and 38. For the purpose of rectifying the output of the transformer 34, rectifiers 48, 50, 52, 54, 56 and 58 are electrically connected to secondary winding sections 60 and 62 of the transformer 34.

In accordance with the teachings of this invention, temperature compensating means 64, comprising the temperature responsive resistors 66, 68 and 70 and the resistor 72, is provided in order to compensate for changes in the output currents of the sensing and reference networks 16 and 18 due to changes in the temperature of the surrounding air. By providing such compensation, a resultant flux of predetermined magnitude is produced in the magnetic amplifier 20 by the output currents of the networks 16 and 18 when the output voltage of the generator 12 is at its regulated value, irrespective of the magnitude of the temperature of the surrounding air. It is to be noted that the temperature compensating means 64 is provided in combination with the sensing network 16 rather than in conjunction with the reference network 18. The reason for this is that the insertion of the temperature compensating means 64 in the reference network 18 would affect the accuracy of the network 18. In practice, the components of the networks 16 and 18 are so constructed as to properly cooperate with the temperature compensating means 64 and thereby obtain the desired temperature compensation.

In this instance, the magnetic amplifier 20 comprises magnetic core members 80 and 82 which have disposed in inductive relationship therewith control windings 84 and 86, and control windings 88 and 90, respectively. In order to render the control windings 86 and 90 responsive to the current output of the sensing network 16, these control windings are connected in series circuit relationship, one end of the series circuit being electrically connected to one end of the resistor 72 and the other end of this series circuit being electrically connected to the rectifier 58. As illustrated, the resistors 66 and 68 are connected in series circuit relationship, one end of this series circuit being connected to the end of the resistor 72 remote from the connection with control windings 86 and 90, and the other end of this series circuit is connected to the rectifier 48. The resistor 70, in turn, is electrically connected to the junction point of the resistors 66 and 68 and to the rectifier 58.

The manner in which the three-phase sensing circuit 16 supplies direct current to the control windings 86 and 90 of the magnetic amplifier 20 can be better understood by tracing the flow of current through the sensing network 16. For instance, assuming the left end of the secondary winding section 62 is at a positive polarity, current will flow from this end of the section through the rectifier 56, the resistors 66, 68 and 72, the control windings 86 and 90 of the magnetic amplifier 20, and the rectifier 54, to the other end of the secondary winding section 62. During the second phase in which the left end of the secondary winding section 60 is at a positive polarity, current will flow from this left end through the rectifier 52, the resistors 66, 68 and 72, the control windings 86 and 90 of the magnetic amplifier 20, and the rectifier 50 to the other end of the secondary winding section 60. On the other hand, during the third phase in which the right end of the secondary winding section 60 is at a positive polarity, current will flow from this right end through the rectifier 48, the resistors 66, 68 and 72, the control windings 86 and 90, and the rectifier 58 to the left end of the secondary winding section 62.

Referring again to the reference network 18, it comprises a saturating transformer 94 having a magnetic core member 96, preferably formed from square looped core material. In order to magnetically saturate the core member 96, in accordance with the voltage between the line conductors 38 and 40, a primary winding 98 is disposed in inductive relationship with the core member 96. In operation, the voltage between the line conductors 38 and 40 is always of sufficient magnitude to affect a substantially complete saturation of the magnetic core member 96.

When the voltage between the line conductors 38 and 40 is of sufficient magnitude to effect a substantially complete saturation of the core member 96, the impedance of the primary winding 98 is extremely low. Therefore, it is necessary that a resistance member 100 be connected in series circuit relationship with the primary winding 98 in order to limit the magnitude of the current flow through the primary winding 98 and thus prevent excessive heating and resulting damage to the primary winding 98.

In order to produce an average output voltage from the saturating transformer 94, which is substantially independent of the magnitude of its input voltage, a secondary winding 102 is disposed in inductive relationship with the core member 96. The reason the average output voltage across the secondary winding 102 is substantially constant irrespective of the magnitude of the voltage between the line conductors 38 and 40, is that the input voltage is always of such magnitude as to effect a substantially complete saturation of the core member 96. This can be better understood by considering that it takes a predetermined number of volt-seconds to saturate the core member 96, and if the input voltage increases, the core member 96 will saturate within a predetermined time interval which will be of shorter duration than in the case when the input voltage is of lesser magnitude. Further, the areas under the voltage-time curves for the primary winding 98 are of substantially equal magnitude irrespective of the magnitude of the voltage between the line conductors 38 and 40, since the same predetermined volt-seconds are required to saturate the core member 96 each time. Therefore, since there is always a substantially complete saturation of the core member 96 for all magnitudes of voltage between the line conductors 38 and 40 above a predetermined value, the impedance of the secondary winding 102 and thus the average voltage thereacross remains substantially constant for varying magnitudes of voltage between the line conductors 38 and 40. However, even though the average output voltage across the secondary winding 102 is substantially constant irrespective of the magnitude of the voltage between the line conductors 38 and 40, still the magnitude of the average voltage across the secondary winding 102 does vary with changes in the frequency of the voltage between the line conductors 38 and 40.

In order to integrate the output voltage of the saturating transformer 94 and thus maintain the output voltage of the voltage reference device 18 substantially constant over a wide range of variation in the frequency of the input voltage between the line conductors 38 and 40, a linear iron core inductance member 104 is electrically connected between the secondary winding 102 and a full-wave dry-type rectifier 106 having input and output terminals. In particular, one end of the inductance member 104 is electrically connected to one end of the secondary winding 102, the other end of the inductance member 104 being electrically connected to one of the input terminals of the rectifier 106. The other input terminal of the rectifier 106 is electrically connected to the other end of the secondary winding 102.

In order for the inductance member 104 to function properly as an integrating device and thus have its impedance vary directly as the frequency of the voltage across the secondary winding 102 of the saturating transformer 94, the value of the reactive impedance for the inductance member 104 must be large as compared to the resistance value presented by the control windings 84 and 88 of the magnetic amplifier 20 and by an inductance member 108. It is to be noted that although the reference network 18 maintains the voltage across the control windings 84 and 88 substantially constant over a wide range in the magnitude and frequency of the input voltage as it appears between the line conductors 38 and 40, it also has a large power output for a given power input, this feature being obtained by providing the integrating means or inductance member 104 which has an extremely low power loss. Thus, as is desired, substantially all the power output from the saturating transformer 94 is supplied to the control windings 84 and 88 of the magnetic amplifier 20.

In order to assure that the voltage reference network 18 will present a high impedance to the magnetic amplifier 20, the linear iron core inductance member 108 is provided. In this instance, the inductance member 108 is connected in series circuit relationship with the control windings 84 and 88 of the magnetic amplifier 20, this series circuit being so electrically connected across the output terminals of the rectifier 106 that the control windings 84 and 88 are responsive to the output current of the reference network 18. As hereinbefore mentioned, the output current of the sensing network 16 that flows through the control windings 86 and 90 produces flux in the core members 80 and 82, respectively, which is always of greater magnitude than the flux produced in these core members by the output current of the reference network 18 which flows through the control windings 84 and 88, the fluxes produced by the current flow through the control windings 86 and 90 opposing the fluxes produced by the current flow through the control windings 84 and 88, respectively. The inductance member 108 also presents a low impedance, as seen from the input side of the rectifier 106. This condition meets the requirement that the load be of low impedance as compared to the inductance member 104, in order for the inductance member 104 to function properly as an integrating means. Not only does the inductance member 108 provide the desired impedance, but it likewise functions to filter the rectified output current from the rectifier 106.

The insertion of the inductance member 108 tends to decrease the accuracy of the reference network 18, therefore, in order to obtain an extremely constant output voltage for the reference network 18, a capacitor 110 is electrically connected in circuit relationship with the input terminals of the rectifier 106. It is to be noted that the capacitor 110 and the inductance member 104 do not form a resonant circuit.

Again referring to the magnetic amplifier 20, self-saturation of this magnetic amplifier is obtained by disposing in inductive relationship with the core members 80 and 82, load windings 114 and 116, respectively, and connecting in series circuit relationship therewith self-saturating rectifiers 118 and 120, respectively, so that current flows in only one direction through the load windings 114 and 116. Load rectifiers 122 and 124 are also connected in circuit relationship with the load windings 114 and 116, respectively, in order to provide a direct current output for the magnetic amplifier 20. For the purpose of supplying energy to the load windings 114 and 116, a potential transformer 126 having a secondary winding 127 is provided. In particular, one end of the secondary winding 127 is electrically connected to the junction point of the self-saturating rectifiers 118 and 120. The other end of the secondary winding 127 is electrically connected to the junction point of the load rectifiers 122 and 124.

The magnetic core members 80 and 82 of the magnetic amplifier 20 also have disposed in inductive relationship therewith damping windings 128, 130, 132 and 134. In order to prevent oscillations in the regulating system by cancelling out a portion of the time delays effected by the generator 12, the exciter 28, and the magnetic amplifiers 20 and 24, the damping windings 132 and 134 are connected in series circuit relationship with a capacitor 138 and a resistor 139, this series circuit being electrically connected across the armature 30 of the exciter 28. The functioning of the damping windings 128 and 130 of the magnetic amplifier 20 which substantially cancel out the remaining portion of the time delays brought about by the generator 12, the exciter 28, and the magnetic amplifiers 20 and 24, will be described hereinafter.

As hereinbefore mentioned, the three-phase magnetic amplifier 24 is responsive to the output of the magnetic amplifier 20. As illustrated, the magnetic amplifier 24 comprises magnetic core members 140, 142, 144, 146, 148 and 150, which have disposed in inductive relationship therewith load windings 152, 154, 156, 158, 160 and 162, respectively. In this instance, the load windings 152, 154, 156, 158, 160 and 162 have connected in series circuit relationship therewith self-saturating rectifiers 164, 166, 168, 170, 172 and 174, respectively, in order to insure that current flows in only one direction through the respective load windings. As illustrated, the load windings 152, 156, and 160 are so connected to a conductor 176 and the load windings 154, 158 and 162 are so connected to a conductor 178 that the output current of the magnetic amplifier 24 flows in only one direction through the field winding 26 of the exciter 28. A commutating rectifier 180 is electrically connected across the field winding 26 of the exciter 28 for commutating the current through the field winding 26. In other words, the rectifier 180 discharges the field 26 cyclically, thus preventing the flow of unwanted feedback into the load windings 152, 154, 156, 158, 160, and 162 which would render the magnetic amplifier 24 unstable.

In order to bias the magnetic amplifier 24 a predetermined amount, the magnetic core members 140, 142, 144, 146, 148 and 150 have disposed in inductive relationship therewith biasing windings 184, 186, 188, 190, 192 and 194, respectively. As illustrated, the biasing windings 184, 186, 188, 190, 192, and 194 are connected in series circuit relation with one another across the output terminals of a full-wave dry-type rectifier 196 whose input terminals are electrically connected to the load conductors 13' and 13" for receiving energy therefrom.

For the purpose of saturating the magnetic core members 140, 142, 144, 146, 148 and 150 in accordance with the output current of the magnetic amplifier 20, control windings 200, 202, 204, 206, 208 and 210 are disposed in inductive relationship with the core members 140, 142, 144, 146, 148 and 150, respectively. As illustrated, the control windings 200, 202, 204, 206, 208, and 210 are so disposed on their respective core members that current flow therethrough produces flux which opposes the flux produced by the current flow through the associated biasing windings 184, 186, 188, 190, 192, and 194, respectively. In this instance, the control windings 200, 202, 204, 206, 208 and 210 are connected in series circuit relationship with a resistor 212, one end of this series circuit being electrically connected to the junction point of the load winding 114 and the load rectifier 122, and the other end of the series circuit being electrically connected to the junction point of the load winding 116 and the load rectifier 124 of the magnetic amplifier 20. Also connected to the junction point of the load winding 114 and the load rectifier 122 and to the junction point of the load winding 116 and the load rectifier 124 is a capacitor 214 which in combination with the resistor 212 constitutes a filter, having a minimum of delay, and which functions to decouple the inductance of the magnetic amplifier 20 from the inductance of the magnetic amplifier 24.

In order to obtain a voltage which is proportional to the derivative of the output voltage of the magnetic amplifier 24, damping windings 218, 220, 222, 224, 226 and 228 are disposed in inductive relationship with the magnetic core members 140, 142, 144, 146, 148, and 150, respectively. The voltage induced in the damping windings 218, 220, 222, 224, 226, and 228 by a sudden change in the magnitude of the current flow through the control windings 200, 202, 204, 206, 208, and 210, which induced voltage is proportional to the derivative of the output voltage of the magnetic amplifier 24, is delayed by a network comprising a linear inductance member 230 and a resistor 232. As illustrated, the damping windings 218, 220, 222, 224, 226 and 228 of the magnetic amplifier 24, the damping windings 130 and 128 of the magnetic amplifier 20 and the linear inductance member 230 and the resistor 232 are all connected in series circuit relationship with one another, with the damping windings 128 and 130 being so disposed on their respective core members 80 and 82 that the current flow therethrough produces a flux in the core members which opposes the change in the flux produced by the current flow through the control windings 86 and 90 of the magnetic amplifier 20. However, the current flow through the damping windings 132 and 134 of the magnetic amplifier 20 produces a flux in the core members 80 and 82, respectively, which opposes the flux produced by the current flow through the control windings 86 and 90, respectively when there is an increase in the magnitude of the voltage across the field winding 14 of the generator 12 in the positive direction.

It is to be noted that by providing the damping windings 128 and 130 of the magnetic amplifier 20 and the damping windings 218, 220, 222, 224, 226 and 228 of the magnetic amplifier 24 and by interconnecting them by means of the delay network comprising the inductance member 230 and the resistor 232, the stability of the regulating system 10 is greatly increased without sacrificing the gain of the magnetic amplifiers 20 and 24. This is an important feature both from the standpoint of the operation of the apparatus, as well as from the standpoint of the original cost of the apparatus.

In order to increase the output current of the magnetic amplifier 24, as applied to the field winding 26 of the exciter 28, without increasing the output of the magnetic amplifier 20 which takes a predetermined time for such an increase, a three-phase potential transformer 240 responsive to the output voltage of the generator 12 and current transformers 242, 244 and 246 responsive to the load current of the generator 12 are so interconnected as to produce a combined output voltage which is applied to the load windings 152, 154, 156, 158, 160 and 162 of the magnetic amplifier 24. Thus, by so increasing the output of the magnetic amplifier 24 without increasing the magnitude of the control currents in the magnetic amplifiers 20 and 24, the transient performance of the regulating system 10 is improved. Not only is the transient performance of the regulating system 10 improved, but since less gain in required of the magnetic amplifiers 20 and 24, the stability of the regulating system 10 is also improved.

The effect of applying the combined output voltages of the potential transformer 240 and the current transformers 242, 244 and 246 to the load windings 152, 154, 156, 158, 160 and 162 of the magnetic amplifier 24 can be better understood by referring to Fig. 2 of the drawings, which illustrates the manner in which the magnitude of the output current from the magnetic amplifier 24, and thus the magnitude of the current flow through the field winding 26 of the exciter 28, varies with changes in the magnitude of the current flow through the control windings 200, 202, 204, 206, 208, and 210 of the magnetic amplifier 24, under various conditions. For instance, a curve A represents the manner in which the output current of the magnetic amplifier 24 varies with changes in the magnitude of the current flow through the control windings 200, 202, 204, 206, 208, and 210 when the current transformers 242, 244 and 246 are not provided. However, when the current transformers 242, 244 and 246 are provided and are responsive to the load current of the generator 12 and are interconnected with the potential transformer 240 and with the magnetic amplifier 24, as illustrated in Fig. 1, the output current of the magnetic amplifier 24 varies with changes in the magnitude of the control current through the control windings 200, 202, 204, 206, 208 and 210, as represented by a curve B illustrated in Fig. 2.

Of course, it is to be understood that if there is no generator load current flowing, the current transformers 242, 244, and 246 absorb a certain amount of the output voltage of the potential transformer 240. A curve C illustrates the manner in which the output current of the magnetic amplifier 24 varies with changes in the magnitude of the current flow through the control windings 200, 202, 204, 206, 208, and 210 when the load current flowing from the generator 12 is of zero magnitude and the current transformers 242, 244, and 246 are connected as illustrated.

Another advantage is also to be gained by providing the potential transformer 240 and the current transformers 242, 244 and 246 and properly interconnecting them with the magnetic amplifier 24. This advantage is that if the load should, for some reason, become shorted, thereby reducing the output voltage of the transformer 240 to zero, the current transformers 242, 244 and 246 continue to supply voltage to the load windings 152, 154, 156, 158, 160 and 162 of the magnetic amplifier 24, thereby providing field excitation for the generator 12, even though the load is shorted. Thus, by providing this equipment, a shut-down of the generator 12 is prevented.

The manner in which the load windings 152, 154, 156, 158, 160, and 162 of the magnetic amplifier 24 receive energy from the potential transformer 240, which comprises secondary winding sections 250, 252, and 254, and from the current transformers 242, 244, and 246 can be better understood by tracing the current flow through these load windings during various phases of the output voltage of the transformer 240. Assuming the right end of the secondary winding section 254 of the transformer 240 is at a positive polarity then current flows from this end through the current transformer 242, the current transformer 244, the secondary winding section 252, the self-saturating rectifier 168 of the magnetic amplifier 24, the load winding 156, the field winding 26 of the exciter 28, the load winding 162 of the magnetic amplifier 24, and the self-saturating rectifier 174, to the other end of the secondary winding section 254. When the right end of the secondary winding section 254 is at a positive polarity, current also flows from this right end through the current transformer 242, the current transformer 246, the secondary winding section 250, the self-saturating rectifier 164 of the magnetic amplifier 24, the load winding 152, the field winding 26 of the exciter 28, the load winding 162 of the magnetic amplifier 24, and the self-saturating rectifier 174, back to the other end of the secondary winding section 254 of the transformer 240.

During the next phase of the output voltage of the transformer 240 in which the right end of the secondary winding section 252 is at a positive polarity, current flows from this right end through the current transformer 244, the current transformer 246, the secondary winding section 250, the self-saturating rectifier 164 of the magnetic amplifier 24, the load winding 152, the field winding 26 of the exciter 28, the load winding 158 of the magnetic amplifier 24, and the self-saturating rectifier 170, back to the other end of the secondary winding section 252 of the transformer 240. When the right end of the secondary winding section 252 is at a positive polarity, current also flows from this right end through the current transformer 244, the current transformer 242, the secondary winding section 254 of the transformer 240, the self-saturating rectifier 172 of the magnetic amplifier 24, the load winding 160, the field winding 26 of the exciter 28, the load winding 158 of the magnetic amplifier 24, and the self-saturating rectifier 170, back to the other end of the secondary winding section 252 of the transformer 240.

During the next phase of the output voltage, the transformer 240 in which the right end of the secondary winding section 250 is at a positive polarity, current flows from this right end through the current transformer 246, the current transformer 244, the secondary winding section 252, the self-saturating rectifier 168 of the magnetic amplifier 24, the load winding 156, the field winding 26 of the exciter 28, the load winding 154 of the magnetic amplifier 24, and the self-saturating rectifier 166, back to the other end of the secondary winding section 250 of the transformer 240. When the right end of the secondary winding section 250 is at a positive polarity, current also flows from this right end through the current transformer 246, the current transformer 242, the secondary winding section 254, the self-saturating rectifier 172 of the magnetic amplifier 24, the load winding 160, the field winding 26 of the exciter 28, the load winding 154 of the magnetic amplifier 24, and the self-saturating rectifier 166, back to the other end of the secondary winding section 250 of the transformer 240.

The overall operation of the regulating system 10, in general, will now be described. Assuming there is an increase in the output voltage of the generator 12 above its regulated value, the output current of the sensing network 16 increases to thereby increase the magnitude of the current flow through the control windings 86 and 90 of the magnetic amplifier 20. The increased current flow through the control windings 86 and 90 increases the magnitude of the fluxes produced thereby in the core members 80 and 82, respectively, which fluxes oppose the fluxes produced in the core members 80 and 82 by the current flow through the load windings 114 and 116, respectively, thereby decreasing the output current of the magnetic amplifier 20. With a decrease in the output current of the magnetic amplifier 20, the output of the magnetic amplifier 24 also decreases to thereby decrease the magnitude of the current flow through the field winding 26 of the exciter 28. This latter action decreases the voltage across the field winding 14 of the generator 12 to thereby return its output voltage to the regulated value.

On the other hand, assuming the output voltage of the generator 12 decreases to a value below its regulated value, the output of the sensing network 16 also decreases to thereby decrease the magnitude of the current flow through the control windings 86 and 90 of the magnetic amplifier 20. A decrease in the magnitude of the current flow through the control windings 86 and 90 decreases the magnitude of the fluxes produced thereby in the core members 80 and 82, respectively, which fluxes oppose the fluxes produced in the core members 80 and 82, respectively, by the current flow through the load windings 114 and 116, respectively, thereby increasing the output current of the magnetic amplifier 20. An increase in the output current of the magnetic amplifier 20 increases the output current of the magnetic amplifier 24 to thereby increase the magnitude of the current flow through the field winding 26 of the exciter 28, thus returning the output voltage of the generator 12 to its regulated value.

The apparatus embodying the teachings of this invention has several advantages. For instance, the regulating system 10 has good stability and yet has a high gain. In addition, the regulating system 10 has a high speed of response as well as a high gain. It is also suitable for operation over a wide range of variation in the magnitude and frequency of the output voltage of the generator 12. Further, the system is substantially insensitive to changes in the temperature of the surrounding air. Preventive means are also provided in case the load is shorted, so that the current transformers 242, 244 and 246 disposed in inductive relationship with the load conductors 13, 13', and 13'', respectively, continue to supply voltage to the magnetic amplifier 24 and thus maintain the generator 12 in operation.

Since numerous changes may be made in the above-described circuits and apparatus, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a regulating system for maintaining the output voltage of an alternator substantially constant, the combination comprising, a field winding for the alternator, a reference network having a substantially constant output voltage, a sensing network including temperature compensating means, the sensing network being responsive to the output voltage of the alternator, a saturable reactor comprising magnetic core means having disposed in inductive relationship therewith a load winding, circuit means for connecting the outputs of the reference and sensing networks to the saturable reactor for producing a resultant flux in the magnetic core means which is determined by the difference in the output currents of the reference and sensing networks, the reference and sensing networks being so constructed that at a given output voltage of the alternator the resultant flux is of predetermined magnitude irrespective of the temperature of the air surrounding the regulating system, supply means for passing current through the load winding, another saturable reactor responsive to the current flow through the load winding and comprising other magnetic core means having disposed in inductive relationship therewith a damping winding, another damping winding disposed in inductive relationship with the magnetic core means of said saturable reactor, other circuit means including a delay network for interconnecting the damping windings to thereby prevent oscillations in the regulating system, and means for rendering the field winding of the alternator responsive to the output of said another saturable reactor to thereby maintain the output voltage of the alternator substantially constant.

2. In a regulating system for maintaining the output voltage of an alternator substantially constant, the combination comprising, a field winding for the alternator, a reference network having a substantially constant output voltage, a sensing network including temperature compensating means, the sensing network being responsive to the output voltage of the alternator, a saturable reactor comprising magnetic core means having disposed in inductive relationship therewith load windings and two control windings, circuit means for connecting one of the control windings to the output of the sensing network, other circuit means for connecting the other control winding to the output of the reference network, the control windings being so disposed on the magnetic core means and the reference and sensing networks being so constructed that at a given output voltage of the alternator the fluxes produced in the magnetic core means by the current flow through the control windings are opposite in sense to thereby produce a resultant flux of predetermined magnitude irrespective of the magnitude of the temperature of the air surrounding the regulating system, supply means for passing current through the load windings, another saturable reactor responsive to the current flow through the load windings and comprising other magnetic core means having disposed in inductive relationship therewith a damping winding, another damping winding disposed in inductive relationship with the magnetic core means of said saturable reactor, still other circuit means including a delay network for interconnecting the damping windings to thereby prevent oscillations in the regulating system, and means for rendering the field winding of the alternator responsive to the output of said another saturable reactor to thereby maintain the output voltage of the alternator substantially constant.

3. In a regulating system for maintaining the output voltage of an alternator substantially constant, the combination comprising, a field winding for the alternator, a reference network having a substantially constant output voltage, a sensing network including temperature compensating means, the sensing network being responsive to the output voltage of the alternator, a first saturable reactor comprising magnetic core means having disposed in inductive relationship therewith load windings and two control windings, circuit means for connecting one of the control windings to the output of the sensing network, other circuit means for connecting the other control winding to the output of the reference network, the control windings being so disposed on the magnetic core means and the reference and sensing networks being so constructed that at a given output voltage of the alternator the fluxes produced in the magnetic core means by the current flow through the control windings are opposite in sense to thereby produce a resultant flux of predetermined magnitude irrespective of the magnitude of the temperature of the air surrounding the regulating system, supply means for passing current through the load windings, a second saturable reactor comprising other magnetic core means having disposed in inductive relationship therewith other load windings and still another control winding responsive to the current flow through the load windings of the first saturable reactor, a current transformer responsive to the output current of the alternator and a potential transformer responsive to the output voltage of the alternator, still other circuit means for applying the sum of the output voltages of the current and potential transformers to the load windings of the second saturable reactor, and means for rendering the field winding of the alternator responsive to the current flow through the load windings of the second saturable reactor to thereby maintain the output voltage of the alternator substantially constant.

4. In a regulating system for maintaining the output voltage of an alternator substantially constant, the combination comprising, a field winding for the alternator, a reference network having a substantially constant output voltage, a sensing network including temperature compensating means, the sensing network being responsive to the output voltage of the alternator, a first saturable reactor comprising magnetic core means having disposed in inductive relationship therewith load windings and two control windings, circuit means for connecting one of the control windings to the output of the sensing network, other circuit means for connecting the other control winding to the output of the reference network, the control windings being so disposed on the magnetic core means and the reference and sensing networks being so constructed that at a given output voltage of the alternator the fluxes produced in the magnetic core means by the current flow through the control windings are opposite in sense to thereby produce a resultant flux of predetermined magnitude irrespective of the magnitude of the temperature of the air surrounding the regulating system, supply means for passing current through the load windings, a second saturable reactor comprising other magnetic core means having disposed in inductive relationship therewith other load windings and still another control winding responsive to the current flow through the load windings of the first saturable reactor, a current transformer responsive to the output current of the alternator, a potential transformer responsive to the output voltage of the alternator, still other circuit means for applying the sum of the output voltages of the current and potential transformers to the load windings of the second saturable reactor, a damping winding disposed in inductive relationship with each of the magnetic core means of the first and second saturable reactors, a delay network interconnecting the damping windings so as to complete an electrical circuit therebetween, and means for rendering the field winding of the alternator responsive to the current flow through the load windings of the second saturable reactor to thereby maintain the output voltage of the alternator substantially constant.

5. In a regulating system for maintaining the output voltage of an alternator substantially constant, the combination comprising, a field winding for the alternator, a reference network having a substantially constant output voltage, a sensing network including temperature compensating means, the sensing network being responsive to the output voltage of the alternator, a first saturable reactor comprising magnetic core having disposed in inductive relationship therewith load windings and two control windings, circuit means for connecting one of the control windings to the output of the sensing network, other circuit means for connecting the other control winding to the output of the reference network, the control windings being so disposed on the magnetic core means and the reference and sensing networks being so constructed that at a given output voltage of the alternator the fluxes produced in the magnetic core means by the current flow through the control windings are opposite in sense to thereby produce a resultant flux of predetermined magnitude irrespective of the magnitude of the temperature of the air surrounding the regulating system, supply means for passing current through the load windings, a second saturable reactor comprising other magnetic core means having disposed in inductive relationship therewith other load windings and still another control winding responsive to the current flow through the load windings of the first saturable reactor, a current transformer responsive to the output current of the alternator, a potential transformer responsive to the output voltage of the alternator, still other circuit means for applying the sum of the output voltages of the current and potential transformers to the load windings of the second saturable reactor, a damping winding disposed in inductive relationship with each of the magnetic core means of the first and second saturable reactors, a delay network including a series connected linear inductance member and resistor interconnecting the damping windings so as to complete an electrical circuit therebetween, and means for rendering the field winding of the alternator responsive to the current flow through the load windings of the second saturable reactor to thereby maintain the output voltage of the alternator substantially constant.

6. In a regulating system for maintaining the output voltage of an alternator substantially constant, the combination comprising, a field winding for the alternator, a reference network including a self-saturating transformer and integrating means responsive to the output of the saturating transformer for producing an output voltage for the reference network which is substantially constant over a wide range of variation in the magnitude and frequency of the input voltage of the reference network, as applied to the input of the saturating transformer, a sensing network including temperature compensating means, the sensing network being responsive to the output voltage of the alternator, a saturable reactor comprising magnetic core means having disposed in inductive relationship therewith load windings and two control windings, circuit means for connecting one of the control windings to the output of the sensing network, other circuit means for connecting the other control winding to the output of the reference network, the control windings being so disposed on the magnetic core means and the reference and sensing networks being so constructed that at a given output voltage of the alternator the fluxes produced in the magnetic core means by the current flow through the control windings are opposite in sense to thereby produce a resultant flux of predetermined magnitude irrespective of the temperature of the air surrounding the regulating system, supply means for passing current through the load windings, and means for rendering the field winding of the alternator responsive to the curernt flow through the load windings to thereby maintain the output voltage of the alternator substantially constant.

7. In a regulating system for maintaining the output voltage of an alternator substantially constant, the combination comprising, a field winding for the alternator, a reference network having a substantially constant output voltage, a sensing network comprising temperature compensating means which includes temperature sensitive resistors, the sensing network being responsive to the output voltage of the alternator, a saturable reactor comprising magnetic core means having disposed in inductive relationship therewith load windings and two control windings, circuit means for connecting one of the control windings to the output of the sensing network, other circuit means for connecting the other control winding to the output of the reference network, the control windings being so disposed on the magnetic core means and the reference and sensing networks being so constructed that at a given output voltage of the alternator the fluxes produced in the magnetic core means by the current flow through the control windings are opposite in sense to thereby produce a resultant flux of predetermined magnitude irrespective of the temperature of the air surrounding the regulating system, supply means for passing current through the load windings, and means for rendering the field winding of the alternator responsive to the current flow through the load windings to thereby maintain the output voltage of the alternator substantially constant.

References Cited in the file of this patent

UNITED STATES PATENTS

| | | |
|---|---|---|
| 2,447,655 | Kirshbaum | Aug. 24, 1948 |
| 2,558,572 | Logan | June 26, 1951 |